(12) United States Patent
Oe et al.

(10) Patent No.: US 8,097,360 B2
(45) Date of Patent: Jan. 17, 2012

(54) METHOD FOR PRODUCING ELECTROLYTE SOLUTION FOR LITHIUM ION BATTERY AND BATTERY USING SAME

(75) Inventors: Meguru Oe, Yamaguchi (JP); Keiji Sato, Yamaguchi (JP); Hiroaki Sakaguchi, Chiba (JP)

(73) Assignee: Central Glass Company, Limited, Ube-shi (JP)

( * ) Notice: Subject to any disclaimer, the term of this patent is extended or adjusted under 35 U.S.C. 154(b) by 699 days.

(21) Appl. No.: 11/911,901

(22) PCT Filed: Apr. 10, 2006

(86) PCT No.: PCT/JP2006/307541
§ 371 (c)(1),
(2), (4) Date: Oct. 18, 2007

(87) PCT Pub. No.: WO2006/115025
PCT Pub. Date: Nov. 2, 2006

(65) Prior Publication Data
US 2009/0081559 A1 Mar. 26, 2009

(30) Foreign Application Priority Data
Apr. 19, 2005 (JP) ................... 2005-120558

(51) Int. Cl.
*H01M 6/04* (2006.01)
(52) U.S. Cl. ........ 429/199; 429/200; 429/341; 429/342; 252/62.2
(58) Field of Classification Search ................. 429/342, 429/200, 341, 326, 331, 333, 199; 29/623.1; 423/301; 252/62.2
See application file for complete search history.

(56) References Cited

U.S. PATENT DOCUMENTS

| | | | |
|---|---|---|---|
| 3,607,020 A | 9/1971 | Smith, Jr. | |
| 5,866,093 A * | 2/1999 | Belt et al. | ........... 423/301 |
| 6,197,205 B1 | 3/2001 | Tsujioka et al. | |
| 6,387,340 B1 | 5/2002 | Na et al. | |

FOREIGN PATENT DOCUMENTS

| | | |
|---|---|---|
| CA | 2193119 A1 | 6/1997 |
| DE | 199 63 399 A1 | 7/2000 |
| EP | 1 055 640 A1 | 11/2000 |
| JP | 64-72901 A | 3/1989 |
| JP | 6-56413 A | 3/1994 |
| JP | 9-165210 A | 6/1997 |
| JP | 9-245807 A | 9/1997 |
| JP | 10-72207 A | 3/1998 |
| JP | 10-81505 A | 3/1998 |
| JP | 11-171518 A | 6/1999 |
| JP | 2000-82474 A | 3/2000 |
| JP | 2000-211907 A | 8/2000 |
| WO | WO 99/41193 A1 | 8/1999 |

OTHER PUBLICATIONS

International Search Report dated Jul. 25, 2006 with an English translation of the pertinent portions (Six (6) pages).
Chinese Office Action dated Sep. 19, 2008 with English translation (Seven (7) pages).
European Search Report dated Sep. 21, 2011 (seven (7) pages).

* cited by examiner

*Primary Examiner* — Raymond Alejandro
(74) *Attorney, Agent, or Firm* — Crowell & Moring LLP

(57) ABSTRACT

A method for producing an electrolyte solution for a lithium ion battery involving reacting a lithium halide selected from the group consisting of lithium fluoride, lithium chloride, lithium bromide, lithium iodide and a mixture of at least two of these, with phosphorus pentachloride and hydrogen fluoride in a nonaqueous organic solvent, thereby producing lithium hexafluorophosphate as an electrolyte of the electrolyte solution.

9 Claims, No Drawings

METHOD FOR PRODUCING ELECTROLYTE SOLUTION FOR LITHIUM ION BATTERY AND BATTERY USING SAME

TECHNICAL FIELD

The present invention relates to a method for producing an electrolyte solution for lithium ion batteries, which solution contains lithium hexafluorophosphate as the electrolyte, and to lithium ion batteries using the same.

BACKGROUND OF THE INVENTION

There have been proposed various methods for producing lithium hexafluorophosphate. For example, there is a method (Patent Publication 1) of reacting a solid lithium fluoride with a gaseous phosphorus pentafluoride with no solvent. In this method, a film of the reaction product is formed on the surface of lithium fluoride, thereby the reaction does not proceed completely, and the unreacted lithium fluoride remains. Furthermore, there are a method (Patent Publication 2) of reacting lithium fluoride with HF in phosphorus pentachloride, a method (Patent Publication 3) of reacting phosphorus trichloride, elemental chloride and HF, and the like. In each of these, phosphorus trichloride or phosphorus pentachloride, which is highly hygroscopic, is reacted directly with HF. Therefore, moisture contained in these and moisture absorbed from the air upon charging are introduced, and a lithium oxyfluoride, which is easily hydrolyzed, is generated in and mixed with the product. Even if one tries to use it as the electrolyte of a lithium ion battery, it is hydrolyzed by a trace amount of moisture in the electrolyte solution to generate an acidic substance. Since the electrolyte solution is damaged thereby, there is a problem that it cannot be used as the electrolyte of a lithium ion battery. Furthermore, there is a method (Patent Publication 4) of reacting lithium fluoride with phosphorus pentafluoride in an organic solvent. However, since phosphorus pentafluoride is a gas, a cylinder is necessary for its handling. Therefore, the production of phosphorus pentafluoride is complicated. Since gas is handled, it involves danger, and an expert knowledge is necessary. Furthermore, it is necessary to purify a phosphorus pentafluoride used to have a high purity. Therefore, there is a problem that the cost becomes high to greatly affect the price.

Furthermore, there is a method (Patent Publication 5) of reacting a gaseous phosphorus pentafluoride with lithium fluoride that is dissolved when anhydrous hydrogen fluoride is used as a solvent. In this method, handling is difficult since anhydrous hydrogen fluoride, which is high in vapor pressure, is used as the solvent.

As mentioned above, each of the conventional methods was not necessarily satisfactory in terms of reaction yield, easiness of control of reaction, purity of the obtained product, and the like.

Patent Publication 1: Japanese Patent Application Publication 64-72901
Patent Publication 2: Japanese Patent Application Publication 10-72207
Patent Publication 3: Japanese Patent Application Publication 10-81505
Patent Publication 4: Japanese Patent Application Publication 9-165210
Patent Publication 5: Japanese Patent Application Publication 6-56413

SUMMARY OF THE INVENTION

It is an object of the present invention to directly produce an electrolyte solution in an organic solvent, upon producing an electrolyte solution containing lithium hexafluorophosphate as the electrolyte.

As a result of an eager examination in view of the above-mentioned prior art problems, the present inventors have found that an electrolyte solution for lithium ion batteries can easily be produced by reacting a lithium halide, phosphorus pentachloride, and hydrogen fluoride in an organic solvent, thereby reaching the present invention.

According to the present invention, upon producing an electrolyte solution for lithium ion batteries, which solution contains lithium hexafluorophosphate as the electrolyte, there is provided a method for producing an electrolyte solution for lithium ion batteries, which is characterized in that lithium fluoride, lithium chloride, lithium bromide, lithium iodide or a mixture of any of these is reacted with phosphorus pentachloride and hydrogen fluoride in a nonaqueous organic solvent.

DETAILED DESCRIPTION

According to the present invention, the reaction yield is high, the reaction control is also easy, and the point of product purity is also sufficiently satisfactory, as compared with the conventional methods for producing an electrolyte solution containing lithium hexafluorophosphate. Furthermore, since a solvent for lithium batteries is used as the solvent, it is possible to use the solution after the reaction directly as an electrolyte solution. Thus, it is possible to provide a very simplified production method.

In the production method of the present invention, the reaction yield is high, the reaction control is also easy, and the point of product purity is also sufficiently satisfactory. Furthermore, since one for lithium batteries is used as the solvent, it is possible to use the solution after the reaction directly as an electrolyte solution.

The production method of the present invention is conducted in one kind or a mixed solvent of several kinds of the above-mentioned nonaqueous organic solvents for lithium ion batteries. Although lithium fluoride, lithium chloride, lithium bromide or lithium iodide, and phosphorus pentachloride, and hydrogen fluoride, which are the raw materials, are introduced into these solvents, the order of introduction is not particularly limited. Relative to a nonaqueous organic solvent for batteries, lithium fluoride, lithium chloride, lithium bromide, lithium iodide or a mixture of any of these is mixed with phosphorus pentachloride, which are raw materials. Since these are low in solubility, hydrogen fluoride is introduced to conduct the reaction under a condition that they are dispersed in the solvent. Since lithium hexafluorophosphate formed herein has a very high solubility, it is dissolved in the solvent and does not remain as a film on the surface of the raw materials. Therefore, the reaction proceeds completely.

A carbonate compound or ether compound, which is high in chemical stability and in which solubility of lithium hexafluorophosphate is high, is preferable as the nonaqueous organic solvent used. For example, there are ethylene carbonate, dimethyl carbonate, diethyl carbonate, ethyl methyl carbonate, 1,2-dimethoxyethane, and the like.

The temperature range upon conducting this reaction is $-40°$ C. to $100°$ C., preferably $0°$ C. to $60°$ C. If the reaction temperature is lower than $-40°$ C., the solvent solidifies. Therefore, the reaction does not proceed. In case that it exceeds 100° C., scattering of the solvent or the reaction of the solvent with phosphorus pentachloride occurs. This becomes a cause of coloring or viscosity increase. Therefore, it is not preferable.

The amount of lithium fluoride, lithium chloride, lithium bromide, lithium iodide or a mixture of any of these is 600 g or less in total, preferably 400 g or less, relative to 1 liter of the solvent. Phosphorus pentachloride is in 1000 g or less, preferably 600 g or less, relative thereto. In case that the amount of lithium fluoride, lithium chloride, lithium bromide or lithium iodide is greater than 600 g relative to the solvent, the product becomes saturation, and a film is formed on the surface of lithium fluoride, lithium chloride, lithium bromide or lithium iodide. The unreacted lithium fluoride, lithium chloride, lithium bromide, lithium iodide or mixture of these remains, and viscosity of the solution increases. Therefore, a separation operation such as filtration becomes difficult.

Although the amount of hydrogen fluoride is not limited, it is 450 g or less, preferably 350 g or less, relative to 1 liter of the solvent.

The amounts of the lower limits of introducing the raw materials such as these lithium fluoride, lithium chloride, phosphorus pentachloride, and hydrogen fluoride are each 1 g relative to 1 liter of the solvent. If they are less than 1 g relative to the solvent, the battery electrolyte concentration becomes low, and it does not exhibit a performance that is satisfactory as an electrolyte solution for lithium ion batteries. If the electrolyte concentration is increased by concentration, the solvent for batteries is wasted, and the cost becomes excessive.

In this reaction, lithium hexafluorophosphate as the product is hydrolyzed by moisture. Therefore, it is necessary to conduct the reaction in an atmosphere containing no moisture. That is, it is preferable to conduct the reaction in vacuum or in an inert gas atmosphere such as nitrogen.

A solvent for lithium ion batteries is used as the solvent in the solution obtained as above. Therefore, it is possible to use the solution obtained by the reaction directly as an electrolyte solution for lithium ion batteries. It is possible to obtain lithium hexafluorophosphate of high purity by conducting a precipitation separation by an operation such as cooling or concentration.

In the following, the present invention is described in detail by examples. The present invention is, however, not limited by the examples.

EXAMPLE 1

In a reactor made of PTFE, 5.0 g of lithium fluoride and 20.0 g of phosphorus pentachloride were added to 100 ml of dimethyl carbonate, thereby conducting mixing and dispersion. While this dispersion liquid was cooled and maintained at 10° C., hydrogen fluoride gas was bubbled through a gas introducing tube. When the lithium fluoride dispersed in dimethyl carbonate disappeared, the reaction was terminated. Upon this, the amount of hydrogen fluoride consumed was 15.0 g.

It was possible to confirm the formation of lithium hexafluorophosphate by $^{19}$F-NMR measurement and ion chromatogram of the obtained solution. It was obtained with a yield of 98.7%.

EXAMPLE 2

In a reaction vessel made of PTFE, 81.0 g of phosphorus pentachloride and 17.7 g of lithium chloride were added to 200 ml of diethyl carbonate, thereby conducting mixing and dispersion. While this dispersion liquid was cooled and maintained at 10° C., hydrogen fluoride gas was bubbled through a gas introducing tube. When the lithium chloride dispersed in diethyl carbonate disappeared, the reaction was terminated. Upon this, the amount of hydrogen fluoride consumed was 49.2 g.

The formation of lithium hexafluorophosphate was confirmed by $^{19}$F-NMR measurement and ion chromatogram of the obtained solution. The yield was 98.8%.

EXAMPLE 3

In a reaction vessel made of PTFE, 2.5 g of lithium fluoride, 4.3 g of lithium chloride and 40.3 g of phosphorus pentachloride were added to a solvent obtained by mixing 100 ml of ethylene carbonate with 100 ml of diethyl carbonate, thereby conducting mixing and dispersion. While this dispersion liquid was cooled and maintained at 10° C., hydrogen fluoride gas was bubbled through a gas introducing tube. When the lithium fluoride and the lithium chloride dispersed in the mixed solvent disappeared, the reaction was terminated. Upon this, the amount of hydrogen fluoride consumed was 24.1 g.

The formation of lithium hexafluorophosphate was confirmed by $^{19}$F-NMR measurement and ion chromatogram of the obtained solution. The yield was 98.8%.

EXAMPLE 4

In a reaction vessel made of PTFE, 100 ml of diethyl carbonate solvent were cooled and maintained at 10° C., and 20.5 g of phosphorus pentachloride was added and 10.3 g of hydrogen fluoride was added by bubbling to conduct mixing and the reaction. Furthermore, while the solution was maintained at 10° C., 2.6 g of lithium fluoride were added to further conduct the reaction.

It was possible to confirm the formation of lithium hexafluorophosphate by $^{19}$F-NMR measurement and ion chromatogram of the obtained solution. The yield was 98.7%.

EXAMPLE 5

In a reaction vessel made of PTFE, 100 ml of ethyl methyl carbonate solvent were cooled and maintained at 10° C., and 83.2 g of phosphorus pentachloride was added and 45.0 g of hydrogen fluoride were was added by bubbling to conduct mixing and reaction. Furthermore, while the solution was maintained at 10° C., a mixture of 5.2 g of lithium fluoride and 8.8 g of lithium chloride was added to further conduct the reaction.

It was possible to confirm the formation of lithium hexafluorophosphate by $^{19}$F-NMR measurement and ion chromatogram of the obtained solution. The yield was 98.8%.

The acidic impurity concentration in the solvent was 10 ppm as a result of conducting a purification of the synthesized solution. It becomes 70 ppm when converted to the lithium hexafluorophosphate base. As a result of measuring ionic conductivity of this solution, it was 7.8 mS/cm. It was equivalent to that of one in which lithium hexafluorophosphate had been dissolved in a mixed solvent of ethylene carbonate and diethyl carbonate.

Then, a test cell was prepared by using this solution, and it was subjected to a performance evaluation as an electrolyte solution by a charge and discharge test. Specifically, 5 parts by weight of polyvinylidene fluoride (PVDF) as a binder were mixed with 95 parts by weight of a natural graphite powder. Furthermore, N,N-dimethylformamide was added to make a slurry. This slurry was applied on a nickel mesh, followed by drying at 150° C. for 12 hr, thereby making a test anode body. 10 parts by weight of a graphite powder and 5 parts by weight of PVDF were mixed with 85 parts by weight of lithium cobaltate, and N,N-dimethylformamide was added to make a slurry. This slurry was applied on an aluminum foil, followed by drying at 150° C. for 12 hr, thereby making a test cathode. A test cell was constructed by using a polypropylene nonwoven fabric as the separator, the reaction solution of the present example as the electrolyte solution, and the above anode body and cathode body. Then, a constant current, charge and discharge test was conducted under the following conditions. Both of charge and discharge were conducted at a current density of 0.35 mA/cm$^2$. The charge was conducted until 4.2V, and the discharge was conducted until 2.5V. This charge and discharge cycle was repeated, and the change of discharge capacity was observed. As a result, the charge and discharge efficiency was almost 100%. As a result of repeating the charge and discharge by 100 cycles, discharge capacity did not change at all.

The invention claimed is:

1. A method for producing an electrolyte solution for a lithium ion battery, comprising reacting a lithium halide selected from the group consisting of lithium fluoride, lithium chloride, lithium bromide, lithium iodide and a mixture of at least two of these, with phosphorus pentachloride and hydrogen fluoride in a nonaqueous organic solvent, thereby producing lithium hexafluorophosphate as an electrolyte of the electrolyte solution wherein the reacting is conducted by the method comprising the steps of: (a) adding the lithium halide and the phosphorus pentachloride to the nonaqueous organic solvent, thereby producing a dispersion liquid in which the lithium halide and the phosphorus pentachloride are dispersed; and (b) adding the hydrogen fluoride to the dispersion liquid.

2. A method for producing an electrolyte solution for a lithium ion battery according to claim 1, wherein the nonaqueous organic solvent is a cyclic or chain carbonate or an ether compound having at least two oxygen atoms.

3. A method for producing an electrolyte solution for a lithium ion battery according to claim 2, wherein the cyclic or chain carbonate is selected from the group consisting of ethylene carbonate, propylene carbonate, dimethyl carbonate, diethyl carbonate, and ethyl methyl carbonate.

4. A method for producing an electrolyte solution for a lithium ion battery according to claim 2, wherein the ether compound is 1,2-dimethoxyethane.

5. A lithium ion battery comprising the electrolyte solution obtained by the method according to claim 1.

6. A method for producing an electrolyte solution for a lithium ion battery according to claim 1, wherein the step (b) is conducted by bubbling the hydrogen fluoride through the dispersion liquid.

7. A method for producing an electrolyte solution for a lithium ion battery according to claim 1, wherein the reacting is conducted at a temperature between −40° C. and 100° C.

8. A method for producing an electrolyte solution for a lithium ion battery according to claim 1, wherein the reacting is conducted at a temperature between 0° C. and 60° C.

9. A method for producing an electrolyte solution for a lithium ion battery according to claim 1, wherein the reacting is conducted in an atmosphere free from moisture.

* * * * *